E. G. DANN.
BEARING.
APPLICATION FILED SEPT. 27, 1917.
1,337,203.
Patented Apr. 20, 1920.
2 SHEETS—SHEET 1.
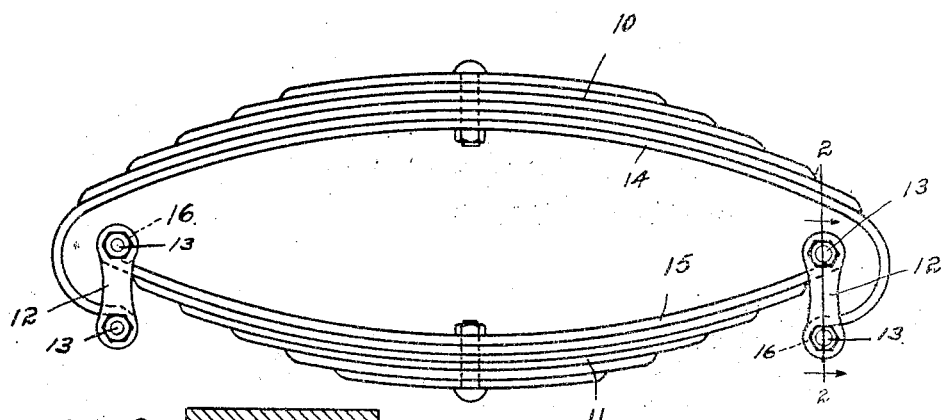
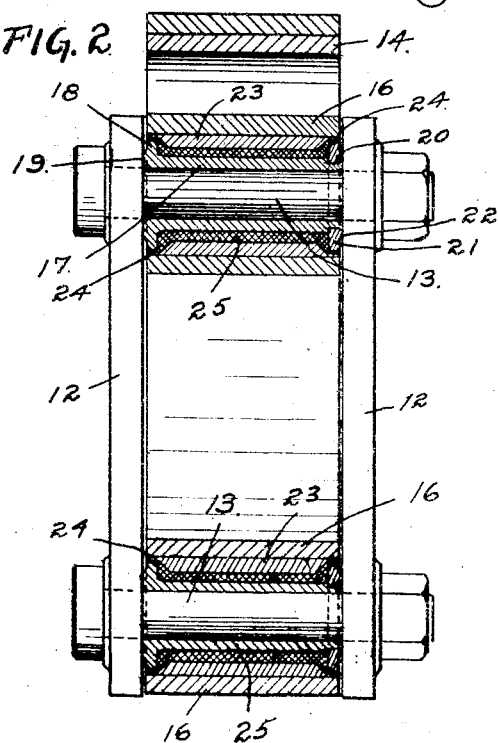
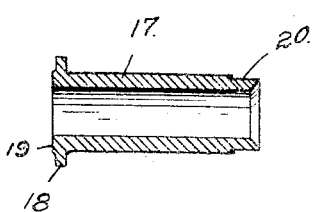
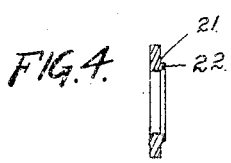
INVENTOR
Ernest G Dann
BY
Barnett Freeman
ATTORNEYS E. G. DANN.
BEARING.
APPLICATION FILED SEPT. 27, 1917.
1,337,203.
Patented Apr. 20, 1920.
2 SHEETS—SHEET 2.
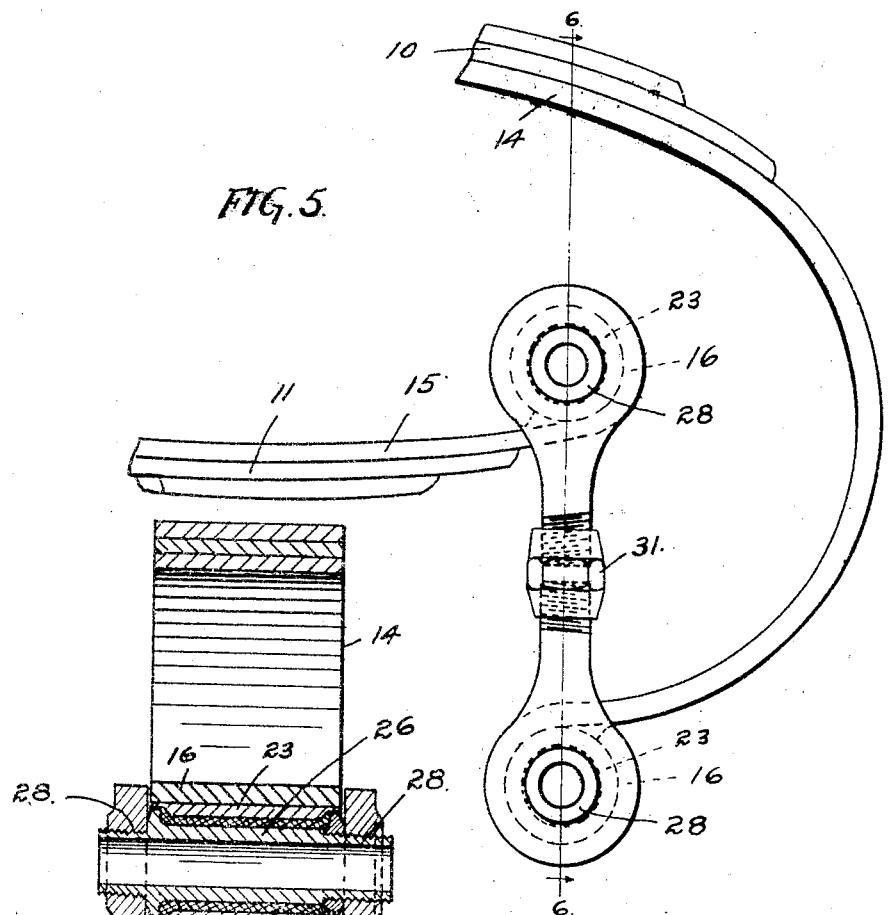
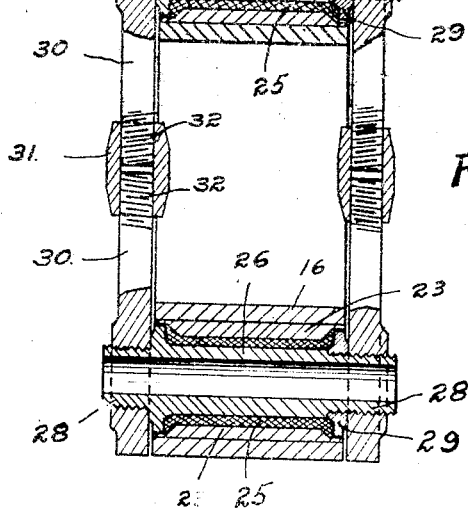
INVENTOR
Ernest G. Dann
BY
Barnett & Truman
ATTORNEYS.

UNITED STATES PATENT OFFICE.

ERNEST G. DANN, OF CHICAGO, ILLINOIS, ASSIGNOR TO THE DANN PRODUCTS COMPANY, A CORPORATION OF OHIO.

BEARING.

1,337,203.           Specification of Letters Patent.      Patented Apr. 20, 1920.

Application filed September 27, 1917. Serial No. 193,440.

*To all whom it may concern:*

Be it known that I, ERNEST G. DANN, a citizen of the United States, residing at Chicago, in the county of Cook and State of Illinois, have invented certain new and useful Improvements in Bearings, of which the following is a specification.

My invention relates to a bearing suitable for use, for example, in a spring shackle or other analogous situations, and the invention has for its object to provide a novel and improved bearing of this type which will not require lubrication.

Another object of the invention is to provide a bearing of the character in which the ends of the same are sealed in a manner to protect the bearing surfaces against dust, grit or other foreign matter.

A further and more specific object of the invention is to provide a self lubricating bearing of the above type which may be readily inserted in the eye or otherwise attached to the extremities of a leaf spring so as to minimize the friction between the spring and the connecting means for attaching the extremities of the spring to another element, for example, another elliptical or semi-elliptical spring.

The invention consists in the novel constructions, arrangements and devices to be hereinafter described and claimed for carrying out the above stated objects, and such other objects as will appear from the following specification.

For the purpose of illustrating my invention I have shown it applied to a leaf spring of the elliptical type such as are commonly employed for automobiles or other vehicles. When used in this manner the utility of the invention resides in its coöperation with the means usually employed for making a connection between the extremity of the spring and the element to which it is attached, for example, another elliptical or semi-elliptical spring, so as to eliminate the use of grease or oil cups which are ordinarily used for lubricating the shackle bolts of automobile springs.

While the device contemplated by my invention is of particular utility in connection with the parts of a spring and has been illustrated in connection with such use, it is obvious that it might be used in other situations where a self lubricating bearing or bushing is required.

The invention is illustrated, in certain preferred embodiments, in the accompanying drawings wherein—

Figure 1 is a view, in elevation, of an automobile spring of familiar type provided with the self lubricating bearings or bushings constructed in accordance with my invention.

Fig. 2 is an enlarged sectional view taken on line 2—2 of Fig. 1.

Fig. 3 is a longitudinal sectional view of the inner member of the bearing.

Fig. 4 is a similar view of the ring or head which, when assembled, fits on one end of the inner member of the bearing.

Fig. 5 is a fragmentary elevation of one end of a vehicle spring illustrating a modification, and Fig. 6 is a sectional view on line 6—6 of Fig. 5.

Like characters of reference designate like parts in the several figures of the drawings.

Referring first to Figs. 1 to 4 inclusive, the spring shown consists of an upper compound leaf spring member 10 of the semi-elliptical scroll type, and a lower semi-elliptical compound leaf spring member 11 which are connected by shackles 12 and shackle bolts 13; these parts all being of familiar construction. The extremeties of the two longer leaves 14 and 15 of the spring are formed with the usual eyes 16 through which the shackle bolts 13 extend.

The connection at each of these points is completed by a self lubricating bearing composed, in the preferred form of the invention shown in Figs. 1 to 4 inclusive, of the following parts: 17 is a sleeve formed at one end with an enlarged head 18 and with a boss 19 against which one of the shackles 12 is rigidly secured by the shackle bolt 13. The other end of sleeve 17 is reduced in thickness, as indicated at 20, to receive a head or ring 21 formed with a boss 22 against which the other shackle bears. The sleeve 17 is, therefore, in substantially rigid relation with the shackles. 23 is an outer sleeve which is driven into the spring eye 16 so as to have a tight fit therewith. The sleeve 23 is reduced in thickness interiorly at its ends, as indicated at 24, to make place for the heads 18, 21 of the inner sleeve. Between these sleeves is interposed a body of metallic lubricant 25 which is preferably united to the outer sleeve 23. The inner sleeve 17 turns within the body of lubricant 25 bearing against the same for its entire length between the heads. The heads bear against the ends of the body of metallic lubricant. This material may consist of any suitable metallic compound of such character that it will lubricate the surfaces bearing against it and be hard enough to resist the thrust of the member or members bearing against it. For example, I employ preferably the packing material described in the patent to G. R. Hayden, No. 721,440, which consists of a metal alloy reduced to spongy condition and mixed with finely divided lead or graphite. It will be observed that the body of lubricating metal is confined between the inner and outer sleeve by means of the heads on the latter so that it cannot be forced out of proper place. The parts are assembled by first thrusting the inner sleeve through the outer sleeve after the latter has been lined with the lubricating material and then driving the head or ring 21 on the reduced end of the inner sleeve. When both of the heads 18, 21 are placed in their operative position the interior or bearing surfaces are effectively sealed against the collection of dust or other foreign matter upon the bearing surfaces.

A spring bushing of the character described will require no lubrication and will last indefinitely. The grease cups ordinarily employed at the ends of springs of this sort may be dispensed with.

A modified construction is shown in Figs. 5 and 6. In this arrangement the inner member 26, which need not necessarily be hollow, is formed with threaded projections 28, the separate head or retaining ring 29 being preferably threaded and screwed upon one end of the member. Each of the shackles is made in two parts 30, 30, which are screwed upon the threaded ends of members 26, the parts of the shackle being united by a turn buckle 31 engaging the oppositely threaded ends 32 of the shackle members. The elasticity of the springs makes it possible to separate the members of the shackle, after they have been screwed upon the inner bushing members 26, far enough to interpose the turn buckles.

While I have described my invention in certain preferred embodiments, it will be understood that further modifications might be made without departure from the principles of the invention.

I claim:

1. The combination with a leaf spring and an element with which the end of the spring is connected, of means for providing said connection comprising two members one arranged within the other, the outer member being reduced in thickness at its end and the inner member being provided with enlarged heads which lie within the spaces formed by reducing the thickness of the ends of the outer member, and a body of metallic lubricant confined between said inner and outer member.

2. The combination with a leaf spring and an element with which the end of the spring is connected, of means for providing said connection comprising two members one arranged within the other, the inner member being formed at one end with an enlarged head, a ring adapted to be engaged with the other end of said inner member, and a body of metallic lubricant between the inner and outer members confined at the ends by said head and ring.

3. A self lubricating bushing comprising an outer sleeve, an inner member, a body of metallic lubricant interposed between said members, one of said members being formed with a head which confines the body of lubricant at one end of the bushing, and a separate head adapted to be engaged with one of said members to confine the body of lubricant at the other end of the bushing.

4. The combination with a leaf spring and an element with which the end of the spring is connected, of means for providing said connection comprising two members one arranged within the other, the inner member being formed at one end with an enlarged head, retaining means adapted to be engaged with the other end of said inner member, and a body of metallic lubricant between the inner and outer members confined at the ends by said head and retaining means.

5. The combination with a leaf spring having an eye, of a sleeve fitted into the eye of the spring, a member revolubly arranged within the sleeve, the ends of which are threaded and project therefrom, a body of metallic lubricant interposed between the sleeve and inner member, a pair of two-part shackles adapted to be screwed upon the threaded extremities of the inner member, and adjustable means for connecting the parts of each of said shackles.

6. A bearing comprising two cylindrical co-axial spaced members and a body of metallic lubricant interposed therebetween, said outer member being terminally reduced in size and said inner member being formed with means adapted to press said lubricant into said reduced terminal portions of said outer member and lock the same longitudinally thereagainst.

7. A device of the character described, comprising two cylindrical co-axial spaced members, the outer member being reduced in thickness at its ends and the inner end provided with enlarged heads lying within the space formed by reducing the thickness of the ends of the outer member, and the body of metallic lubricant confined within said inner and outer members.

8. A device of the character described, comprising two cylindrical co-axial spaced members, the inner member being formed at one end with an enlarged head, retaining means adapted to be engaged with the other end of said inner member and the body of metallic lubricant between the inner and outer members confined at the ends by said head and said retaining means.

ERNEST G. DANN.